(12) United States Patent
Vannithamby et al.

(10) Patent No.: US 9,578,635 B2
(45) Date of Patent: Feb. 21, 2017

(54) METHOD AND APPARATUS FOR AUTONOMOUS CLUSTER HEAD SELECTION FOR MACHINE-TYPE-COMMUNICATIONS (MTC)

(71) Applicant: Intel Corporation, Santa Clara, CA (US)

(72) Inventors: Rath Vannithamby, Portland, OR (US); Maruti Gupta, Portland, OR (US); Mei-Ju Shih, Taichung (TW)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 14/012,062

(22) Filed: Aug. 28, 2013

(65) Prior Publication Data
US 2014/0092833 A1    Apr. 3, 2014

Related U.S. Application Data

(60) Provisional application No. 61/707,784, filed on Sep. 28, 2012.

(51) Int. Cl.
*H04L 1/16* (2006.01)
*H04L 12/403* (2006.01)
(Continued)

(52) U.S. Cl.
CPC ............. *H04W 72/042* (2013.01); *H04B 5/00* (2013.01); *H04B 17/318* (2015.01);
(Continued)

(58) Field of Classification Search
CPC .... H04W 4/005; H04W 28/0215; H04W 4/20; H04W 8/18
(Continued)

(56) References Cited

U.S. PATENT DOCUMENTS 9,332,456 B2    5/2016    Heo et al.
9,374,806 B2    6/2016    Han et al.
(Continued)

FOREIGN PATENT DOCUMENTS

CN    104737485 A    6/2015
CN    104813693 A    7/2015
(Continued)

OTHER PUBLICATIONS

Fazackerley et al., "Cluster head selection using RF signal strength", IEEE Electrical and Computer Engineering, 2009, p. 334-338.*
(Continued)

*Primary Examiner* — Redentor Pasia
*Assistant Examiner* — Peter Mak
(74) *Attorney, Agent, or Firm* — Schwegman Lundberg & Woessner, P.A.

(57) ABSTRACT

The present disclosure presents embodiments of a system and method for improved uplink transmission management in a network that includes one or more machine-type communication (MTC) devices. For example, in an aspect, the present disclosure presents a method of cluster head selection for a MTC device cluster, the method comprising transmitting a polling message from an eNodeB to one or more MTC devices of the MTC cluster, receiving one or more polling responses at the eNodeB from the one or more MTC devices, and determining the set of cluster heads based on the one or more polling responses; and transmitting cluster head information associated with each cluster head of the set of cluster heads to the one or more MTC devices.

11 Claims, 7 Drawing Sheets

(51) Int. Cl.

| | |
|---|---|
| *H04L 12/423* | (2006.01) |
| *H04L 12/26* | (2006.01) |
| *H04W 4/00* | (2009.01) |
| *H04W 4/20* | (2009.01) |
| *H04W 8/18* | (2009.01) |
| *H04W 28/02* | (2009.01) |
| *H04W 72/04* | (2009.01) |
| *H04W 72/12* | (2009.01) |
| *H04W 74/00* | (2009.01) |
| *H04L 5/00* | (2006.01) |
| *H04L 1/18* | (2006.01) |
| *H04W 48/14* | (2009.01) |
| *H04W 72/02* | (2009.01) |
| *H04W 76/02* | (2009.01) |
| *H04W 88/02* | (2009.01) |
| *H04B 17/318* | (2015.01) |
| *H04W 24/10* | (2009.01) |
| *H04W 36/00* | (2009.01) |
| *H04W 76/04* | (2009.01) |
| *H04W 24/08* | (2009.01) |
| *H04W 40/24* | (2009.01) |
| *H04W 48/16* | (2009.01) |
| *H04W 52/02* | (2009.01) |
| *H04W 52/04* | (2009.01) |
| *H04W 52/14* | (2009.01) |
| *H04B 5/00* | (2006.01) |
| *H04J 3/16* | (2006.01) |
| *H04L 5/14* | (2006.01) |
| *H04L 29/06* | (2006.01) |
| *H04L 29/08* | (2006.01) |
| *H04W 8/08* | (2009.01) |
| *H04W 28/08* | (2009.01) |
| *H04W 36/22* | (2009.01) |
| *H04W 48/20* | (2009.01) |
| *H04L 12/24* | (2006.01) |
| *H04W 28/16* | (2009.01) |
| *H04J 11/00* | (2006.01) |
| *H04W 24/02* | (2009.01) |
| *H04W 40/00* | (2009.01) |
| *H04W 76/06* | (2009.01) |
| *H04W 72/00* | (2009.01) |
| *H04W 80/10* | (2009.01) |
| *H04W 36/08* | (2009.01) |
| *H04W 48/18* | (2009.01) |
| *H04W 88/18* | (2009.01) |
| *H04W 88/08* | (2009.01) |
| *H04W 88/14* | (2009.01) |
| *H04W 88/16* | (2009.01) |

(52) U.S. Cl.
CPC .............. *H04J 3/1694* (2013.01); *H04J 11/00* (2013.01); *H04J 11/0086* (2013.01); *H04L 1/1812* (2013.01); *H04L 1/1864* (2013.01); *H04L 5/0035* (2013.01); *H04L 5/0055* (2013.01); *H04L 5/0057* (2013.01); *H04L 5/0073* (2013.01); *H04L 5/14* (2013.01); *H04L 41/5032* (2013.01); *H04L 65/4084* (2013.01); *H04L 65/60* (2013.01); *H04L 65/602* (2013.01); *H04L 65/608* (2013.01); *H04L 67/10* (2013.01); *H04W 4/005* (2013.01); *H04W 8/08* (2013.01); *H04W 24/02* (2013.01); *H04W 24/08* (2013.01); *H04W 24/10* (2013.01); *H04W 28/0215* (2013.01); *H04W 28/0221* (2013.01); *H04W 28/0252* (2013.01); *H04W 28/08* (2013.01); *H04W 28/16* (2013.01); *H04W 36/0061* (2013.01); *H04W 36/0083* (2013.01); *H04W 36/0088* (2013.01); *H04W 36/22* (2013.01); *H04W 40/005* (2013.01); *H04W 40/246* (2013.01); *H04W 48/14* (2013.01); *H04W 48/16* (2013.01); *H04W 48/20* (2013.01); *H04W 52/0209* (2013.01); *H04W 52/0212* (2013.01); *H04W 52/0235* (2013.01); *H04W 52/0258* (2013.01); *H04W 52/04* (2013.01); *H04W 52/14* (2013.01); *H04W 72/02* (2013.01); *H04W 72/044* (2013.01); *H04W 72/0406* (2013.01); *H04W 72/0413* (2013.01); *H04W 72/0486* (2013.01); *H04W 72/1284* (2013.01); *H04W 74/002* (2013.01); *H04W 74/004* (2013.01); *H04W 76/022* (2013.01); *H04W 76/025* (2013.01); *H04W 76/043* (2013.01); *H04W 76/046* (2013.01); *H04W 76/048* (2013.01); *H04W 76/06* (2013.01); *H04W 88/02* (2013.01); *H04L 5/001* (2013.01); *H04W 36/08* (2013.01); *H04W 48/18* (2013.01); *H04W 52/0261* (2013.01); *H04W 72/005* (2013.01); *H04W 80/10* (2013.01); *H04W 88/08* (2013.01); *H04W 88/14* (2013.01); *H04W 88/16* (2013.01); *H04W 88/18* (2013.01); *Y02B 60/50* (2013.01)

(58) Field of Classification Search
USPC ................................. 370/390, 432, 312, 329
See application file for complete search history.

(56) References Cited

U.S. PATENT DOCUMENTS

| | | | | |
|---|---|---|---|---|
| 2007/0091889 A1* | 4/2007 | Xiao | ..................... | H04L 1/1854 370/390 |
| 2008/0183339 A1* | 7/2008 | Vaswani | ................ | G01D 4/004 700/297 |
| 2009/0181670 A1 | 7/2009 | Tseng | | |
| 2010/0110896 A1 | 5/2010 | Tseng et al. | | |
| 2010/0110897 A1 | 5/2010 | Chun et al. | | |
| 2010/0272018 A1 | 10/2010 | Furueda et al. | | |
| 2011/0002281 A1 | 1/2011 | Terry et al. | | |
| 2011/0086652 A1 | 4/2011 | So et al. | | |
| 2011/0270984 A1* | 11/2011 | Park | ........................ | H04W 4/00 709/225 |
| 2012/0064932 A1 | 3/2012 | Lim et al. | | |
| 2012/0120828 A1 | 5/2012 | Anderson et al. | | |
| 2012/0281643 A1* | 11/2012 | Sun | ........................ | H04W 24/10 370/329 |
| 2013/0100871 A1 | 4/2013 | Vujcic | | |
| 2013/0121220 A1 | 5/2013 | Virtej et al. | | |
| 2013/0172036 A1* | 7/2013 | Miklos | .................. | H04W 8/005 455/517 |
| 2013/0322352 A1 | 12/2013 | Han et al. | | |
| 2014/0003375 A1 | 1/2014 | Nam et al. | | |
| 2014/0036810 A1 | 2/2014 | Harrison et al. | | |
| 2014/0293973 A1 | 10/2014 | Lin et al. | | |
| 2014/0357273 A1 | 12/2014 | Teng et al. | | |
| 2015/0109982 A1 | 4/2015 | Futaki | | |
| 2015/0117286 A1 | 4/2015 | Kim et al. | | |
| 2015/0195822 A1 | 7/2015 | Han et al. | | |
| 2015/0223050 A1 | 8/2015 | Yiu et al. | | |
| 2015/0305083 A1 | 10/2015 | Heo et al. | | |

FOREIGN PATENT DOCUMENTS

| | | |
|---|---|---|
| CN | 105103590 A | 11/2015 |
| EP | 2485540 A1 | 8/2012 |
| EP | 2871896 A1 | 5/2015 |
| EP | 2901574 A1 | 8/2015 |
| EP | 2901603 A1 | 8/2015 |
| EP | 2901729 A1 | 8/2015 |

(56) References Cited

FOREIGN PATENT DOCUMENTS

| | | | |
|---|---|---|---|
| EP | 2901740 A1 | 8/2015 | |
| JP | 2009171580 A | 7/2009 | |
| JP | 2012507971 A | 3/2012 | |
| JP | 2012175641 A | 9/2012 | |
| JP | 2015534394 A | 11/2015 | |
| KR | 20100047449 A | 5/2010 | |
| KR | 1020100047449 A | 5/2010 | |
| KR | 1020110111234 A | 10/2011 | |
| KR | 1020120098899 A | 9/2012 | |
| KR | 1020150064016 A | 6/2015 | |
| WO | WO-2011106538 A1 | 9/2011 | |
| WO | WO-2011136321 A1 | 11/2011 | |
| WO | WO-2012057407 A1 | 5/2012 | |
| WO | WO-2012094151 A2 | 7/2012 | |
| WO | WO-2012109542 A1 | 8/2012 | |
| WO | WO-2013107049 A1 | 7/2013 | |
| WO | WO-2014051951 A1 | 4/2014 | |
| WO | WO-2014052730 A1 | 4/2014 | |
| WO | WO-2014052774 A1 | 4/2014 | |
| WO | WO-2014052905 A1 | 4/2014 | |

OTHER PUBLICATIONS

"Chinese Application Serial No. 201380044760.6, Notification on Correction of Deficiencies mailed Apr. 30, 2015", w/ English Translation, 2 pgs.
"Chinese Application Serial No. 201380045631.9, Office Action mailed Mar. 18, 2015", w/ English Translation, 4 pgs.
"European Application Serial No. 13841346.3, Amendment filed Mar. 16, 2015", 25 pgs.
"European Application Serial No. 13841732.4, Amendment filed Feb. 13, 2015", 12 pgs.
"International Application Serial No. PCT/US2013/058153, International Preliminary Report on Patentability mailed Apr. 9, 2015", 7 pgs.
"International Application Serial No. PCT/US2013/062132, International Preliminary Report on Patentability mailed Apr. 9, 2015", 8 pgs.
"International Application Serial No. PCT/US2013/062210, International Preliminary Report on Patentability mailed Apr. 9, 2015", 15 pgs.
"International Application Serial No. PCT/US2013/062427, International Preliminary Report on Patentability mailed Apr. 9, 2015", 8 pgs.
"U.S. Appl. No. 14/125,749, Preliminary Amendment filed Dec. 12, 2013", 8 pgs.
"U.S. Appl. No. 14/127,830, Preliminary Amendment filed Dec. 19, 2013", 12 pgs.
"U.S. Appl. No. 14/125,706, Preliminary Amendment filed Dec. 12, 2013", 14 pgs.
"Evolved Universal Terrestrial Radio Access (E-UTRA); Radio Resource Control (RRC);", 3GPP TS 36.331 V11.1.0 (Sep. 2012) Technical Specification Group Radio Access Network; Protocol specification (Release 11), (Sep. 2012), 325 pgs.
"Evolved Universal Terrestrial Radio Access (E-UTRA); User Equipment (UE) procedures in idle mode", 3GPP TS 36.304 V11.1.0. Technical Specification Group Radio Access Network. (Release 11)., (Sep. 2012), 33 pgs.
"HARQ-ACK PUCCH Resources in Response to ePDCCH Detections", R1-122259, 3GPP TSG RAN WG1 #69. Prague, Czech Republic. Samsung., (May 21, 2012), 2 pgs.
"HARQ-ACK Transmission in Response to E-PDCCH Detection", R1-120193, 3GPP TSG RAN WG1 #68. Samsung., (Feb. 2012), 3 pgs.
"International Application Serial No. PCT/US2013/058153, International Search Report mailed Dec. 13, 2013", 3 pgs.
"International Application Serial No. PCT/US2013/058153, Written Opinion mailed Dec. 13, 2013", 5 pgs.
"International Application Serial No. PCT/US2013/062132, International Search Report mailed Jan. 28, 2014", 3 pgs.
"International Application Serial No. PCT/US2013/062132, Written Opinion mailed Jan. 28, 2014", 6 pgs.
"International Application Serial No. PCT/US2013/062210, International Search Report mailed Feb. 28, 2014", 4 pgs.
"International Application Serial No. PCT/US2013/062210, Invitation to Pay Additional Fees and Partial Search Report mailed Dec. 16, 2013", 7 pgs.
"International Application Serial No. PCT/US2013/062210, Written Opinion mailed Feb. 28, 2014", 13 pgs.
"International Application Serial No. PCT/US2013/062427, International Search Report mailed Jan. 6, 2014", 3 pgs.
"International Application Serial No. PCT/US2013/062427, Written Opinion mailed Jan. 6, 2014", 6 pgs.
"PUCCH Resource Allocation Corresponding to ePDCCH", R1-120666, 3GPP TSG RAN WG1 Meeting #68. ASUSTEK., (Feb. 2012), 2 pgs.
"PUCCH resource allocation for E-PDCCH", R1-120329, 3GPP TSG RAN1 #68. Pantech., (Feb. 2012), 2 pgs.
"PUCCH resource for ePDCCH", R1-123266, 3GPP TSG RAN WG1 Meeting #70. Qingdao, China. Sharp., (Aug. 13, 2012), 8 pgs.
"PUCCH resource mapping with ePDCCH", R1-114066, 3GPP TSG RAN WG1 Meeting #67. Alcatel-Lucent Shanghai Bell, Alcatel-Lucent., (Nov. 2011), 2 pgs.
Chou, Joey, et al., "M2M Polling services", IEEE C802.16p-11/0016r1. IEEE 802.16 Broadband Wireless Access Working Group., [Online] Retrieved From Internet: <http://dot16.org/ul_archive/archive11/archive.shtml>, (Mar. 13, 2011), 12 pgs.
"U.S. Appl. No. 14/125,706, Non Final Office Action mailed Sep. 30, 2015", 22 pgs.
"U.S. Appl. No. 14/125,749, Non Final Office Action mailed Sep. 10, 2015", 10 pgs.
"U.S. Appl. No. 14/125,749, Response Filed Dec. 9, 2015 to Non Final Office Action mailed Sep. 10, 2015", 10 pgs.
"Chinese Application Serial No. 201380045631.9, Preliminary Amendment filed Oct. 20, 2015", W/ English Claims, 27 pgs.
"Japanese Application Serial No. 2015-528730, Office Action mailed Nov. 4, 2015", W/ English Translation, 11 pgs.
"U.S. Appl. No. 14/125,706, Notice of Allowability mailed May 20, 2016", 2 pgs.
"U.S. Appl. No. 14/125,706, Notice of Allowance mailed Feb. 2, 2016", 10 pgs.
"U.S. Appl. No. 14/125,749, Corrected Notice of Allowance mailed Feb. 9, 2016", 2 pgs.
"U.S. Appl. No. 14/125,749, Notice of Allowance mailed Dec. 24, 2015", 10 pgs.
"U.S. Appl. No. 14/127,830, Examiner Interview Summary mailed Mar. 24, 2016", 3 pgs.
"U.S. Appl. No. 14/127,830, Non Final Office Action mailed Jan. 20, 2016", 13 pgs.
"U.S. Appl. No. 14/127,830, Notice of Allowance mailed Jun. 23, 2016", 7 pgs.
"U.S. Appl. No. 14/127,830, Response filed Mar. 23, 2016 to Non Final Office Action mailed Jan. 20, 2016", 18 pgs.
"U.S. Appl. No. 14/757,660, Preliminary Amendment filed Mar. 3, 2016", 5 pgs.
"Chinese Application Serial No. 201380044760.6, Voluntary Amendment filed Jan. 7, 2016", W/ English claims, 5 pgs.
"European Application Serial No. 13841050.1, Extended European Search Report mailed Mar. 23, 2016", 10 pgs.
"European Application Serial No. 13841346.3, Extended European Search Report mailed Mar. 3, 2016", 8 pgs.
"European Application Serial No. 13841732.4, Extended European Search Report mailed Apr. 7, 2016", 9 pgs.
"European Application Serial No. 13842956.8, Extended European Search Report mailed May 2, 2016", 10 pgs.
"HARQ-ACK PUCCH Resources in Response to E-PDCCH Detections", Samsung, R1-121647, 3GPP, (Mar. 20, 2012).
"Japanese Application Serial No. 2015-528730, Response filed Feb. 22, 2016 to Office Action mailed Nov. 4, 2015", (English Translation of Claims), 12 pgs.
"Japanese Application Serial No. 2015-534731, Notice of Reasons for Rejection mailed Mar. 1, 2016", W/ English Translation, 8 pgs.

(56) References Cited

OTHER PUBLICATIONS

"Japanese Application Serial No. 2015-534731, Response filed Jun. 1, 2016 to Notice of Reasons for Rejection mailed Mar. 1, 2016", with English translation of claims, 53 pgs.
"Mobility State Estimation Enhancements using RSR", R2-132810 Mobility State Estimation Using Rsrp, 3rd Generation Partnership Project (3GPP), Mobile Competence Centre ; 650, Route Des Lucioles. (Aug. 10, 2013), Aug. 19, 2013-Aug. 23, 2013.
"Remaining Issues on Resource Allocation for TDD PUCCH format 3", LG Electronics, R1-111692, 3GPP, (May 3, 2011).
"Views on PUCCH Resource Allocation for ePDCCH", NTT DOCOMO, R1-123554, 3GPP, (Aug. 5, 2012).
"WF on PUCCH Format 1a/1b resource allocation for ePDCCH based HARQ-ACKs", Sharp, Nokia Siemens Networks, Nokia, Samsung, Docomo, WF R1-123975, 3GPP, (Aug. 17, 2012).

* cited by examiner

METHOD AND APPARATUS FOR AUTONOMOUS CLUSTER HEAD SELECTION FOR MACHINE-TYPE-COMMUNICATIONS (MTC)

PRIORITY CLAIM

This application claims the benefit of priority under 35 U.S.C. 119(e) to U.S. Provisional Patent Application Ser. No. 61/707,784, filed Sep. 28, 2012, which is incorporated herein by reference in its entirety.

TECHNICAL FIELD

Embodiments described herein pertain generally to communications networks serving machine-type communications (MTC) devices and in particular to methods and apparatus for cluster-head discovery and selection for eNodeBs and MTC devices in such networks.

BACKGROUND

Existing communications networks are increasingly integrating low-cost, low-power, low-capability machine-type communications devices to perform services independent of direct human interaction. MTC devices are typically configured to communicate with an existing wireless network, and may be configured to communicate with network access points and other MTC devices via cellular and WiFi communications standards. MTC devices, however, often exhibit poor uplink communication integrity due to the low-power and relatively limited overall capability of MTC devices. Nevertheless, this uplink communication capability is a required component of MTC devices. Thus, there is a need for improved uplink communication capability in MTC devices.

DETAILED DESCRIPTION

The present disclosure presents example methods and apparatuses for improved uplink power control in wireless environments that include MTC devices. Such environments may include cluster head-based MTC networks, which allow large numbers of MTC devices in an MTC cluster to communicate with a core network through one or more cluster heads of the cluster. In such network architectures, links between cluster heads and the MTC devices are supported by WiFi and the links between the cluster heads and a core network comprise cellular links. In this way, cluster heads may serve as a communication relay point between MTC devices with compromised cellular uplink capability and the cellular and/or core network.

In one aspect of the present disclosure, methods and apparatuses for optimal cluster head selection are presented. In one example, a cellular network device, such as an eNodeB, may poll MTC devices and may discover which MTC devices can serve as cluster heads for an MTC device cluster based on certain criteria. In another aspect of the present disclosure, an MTC device in a cluster may receive beacons from a plurality of potential cluster heads, and, based on the signal-to-noise ratio (SINR) associated with each of the plurality of potential cluster heads, may set a primary and a secondary cluster head for the MTC device. Furthermore, a scheme for communicating control information related to one or more cluster heads of an MTC device cluster is presented.

Figure 1:
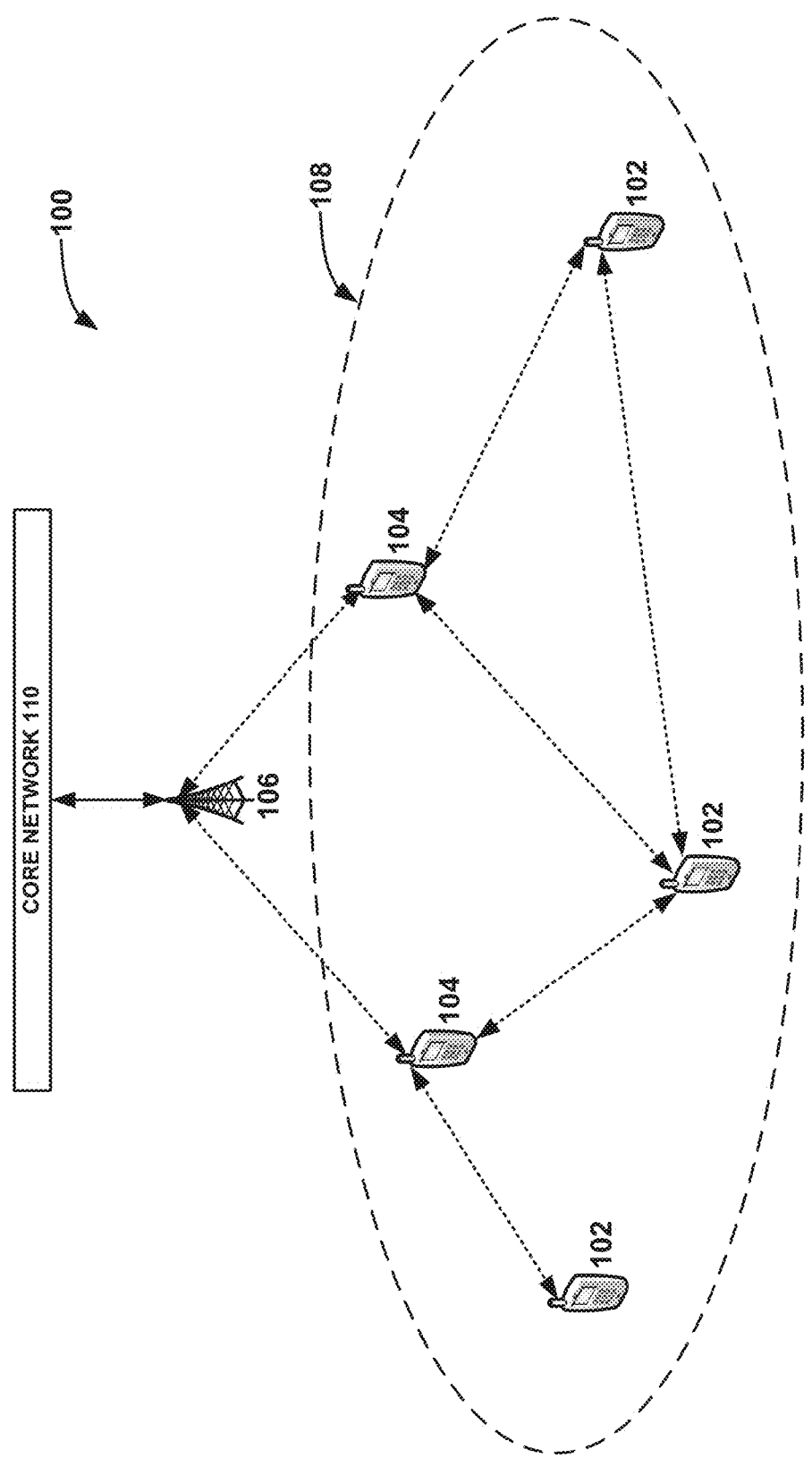
FIG. 1 is a system diagram of an example wireless system including MTC devices and cluster heads.

Turning to the figures, FIG. 1 is a schematic diagram illustrating a system 100 for improved uplink performance of one or more MTC devices 102 in an MFC cluster 108 using one or more cluster heads 104. In some examples, one or more MTC devices 102 may serve as a cluster head 104, though in the example system of FIG. 1, only two such cluster heads 104 are shown. In operation, MTC devices 102 may have compromised uplink capabilities in relation to an eNodeB 106 of a cellular network, which may be communicatively connected to a core network 110. To boost its uplink capability to eNodeB 106 (and, therefore, core network 110), MTC devices 102 may choose one or two cluster heads 104 as the device to which uplink communications may be transmitted, as the communication uplink between the MTC device 102 and the cluster head may be of greater quality than that of the communication link between the MTC device 102 and the eNodeB 106. Furthermore, cluster heads 104 may forward such uplink communications to eNodeB 106, thus essentially serving as an uplink relay device between MTC devices 102 and eNodeB 106 in instances when the uplink channel between an MTC device 102 and eNodeB 106 is compromised.

In an aspect, the MTC devices 102 and/or cluster heads 104 may individually comprise any low-mobility, low-power, and/or low-functionality communications device and may be configured to communicate with other MTC devices 102 and/or cluster heads 104 via cellular and/or WiFi standards. By non-limiting example, MTC devices and/or cluster heads 104 may include a parking meter, security sensor, lock, garage door opener, a wireless access point, or any other MFC device. In additional examples, the MTC devices 102 and/or cluster heads 104 may comprise a mobile device, such as, but not limited to, a smartphone, cellular telephone, mobile phone, laptop computer, tablet computer, or other portable networked device. In addition, MTC devices 102 may also be individually referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In an additional aspect, though eNodeB 106 is shown as the sole cellular network access point of FIG. 1, eNodeB 106 may be replaced by any other network access point, such as, but not limited to, small cells or low power cells, controlled by or otherwise associated with one or more network entities or components, such as, but not limited to a low-power access point, such as a picocell, femtocell, microcell, WiFi hotspot, etc. Additionally, core network 110 may include any type of network, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet.

Additionally, system 100 may comprise a Wideband Code Division Multiple Access (W-CDMA) system, and devices of system 100 may communicate with one another according to this standard. As those skilled in the art will readily appreciate, various aspects described throughout this disclosure may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the system 100 may be coupled to the network(s) via one or more wired or wireless connections.

Figure 2:
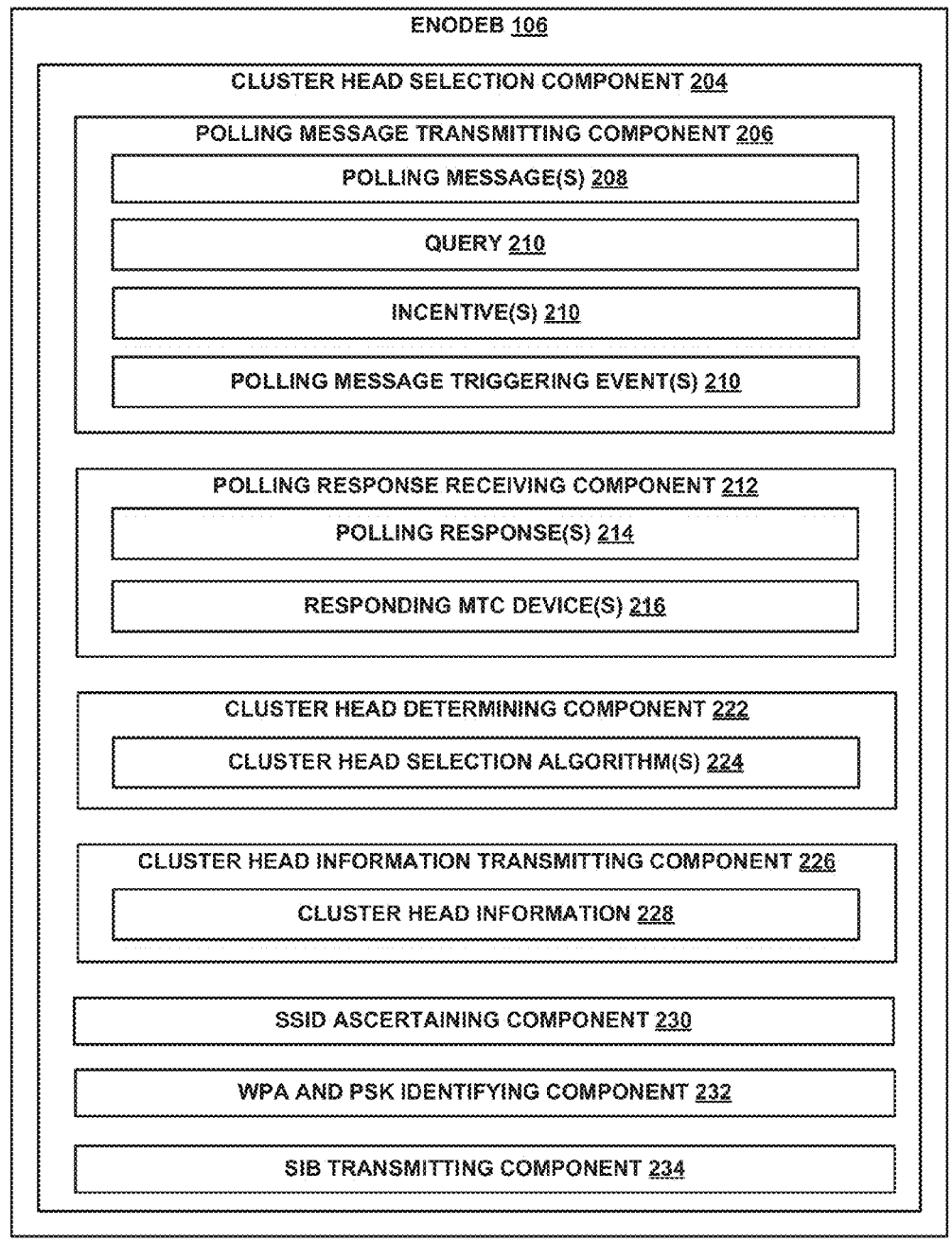
FIG. 2 is a block diagram illustrating an example eNodeB according to an example embodiment of the present disclosure.

FIG. 2 is a block diagram illustrating an example eNodeB 106, according to an example embodiment, which may be configured to manage discovery and selection of cluster heads in an MTC device cluster and its related network. In an aspect, eNodeB 106 may include a cluster head selection component 204, which may be configured to poll for one or more MTC devices within communicative range to determine which MTC devices are willing to serve as cluster heads for the MTC device cluster. Cluster head selection component 204 may include a polling message transmitting component 206, which may be configured to broadcast a polling message 208 to one or more MTC devices, which may include a query 210 as to which of the MTC devices are willing to serve as a cluster head for the MTC device cluster. In some examples, the polling message transmitting component 206 may be further configured to transmit one or more incentives 210 for an MTC device to serve as a cluster head. Such incentives 210 may include, for example, a free subscription to a network associated with eNodeB 106, though other incentives are also possible.

In addition, polling message transmitting component 206 may be configured to broadcast the one or more polling messages 208 at instances corresponding to one or more polling message triggering events 210. In some examples, the polling message triggering events 210 may include a periodic triggering event (e.g. eNodeB 106 broadcasts polling messages 208 at a predetermined frequency) or may include an as-needed triggering event. In some examples, the trigger for polling may be the result of several factors, which may include, but are not limited to, (a) an expected number of MTC devices are not reporting in the uplink, (b) there is unexpectedly too much traffic from existing cluster heads, (c) too many MTC devices are connected to the external network through the existing cluster heads, and/or (d) it has been too long since the last polling message was transmitted (e.g. periodic polling).

In an additional aspect, eNodeB 106 may include a polling response receiving component 212, which may be configured to receive one or more polling responses 214 from one or more responding MTC devices 216 of an MTC device cluster in response to transmitted polling messages. In some examples, the polling responses 214 may include (a) an indication or preference as to whether each of the one or more responding MTC devices 216 are willing to serve as a cluster head; (b) the SINR associated with the eNodeB 106 or other access points reported from the MTC device; (c) a number of MTC devices the MTC device supported if and when the MTC device served as a cluster head in the past (e.g. in the past x hours, for example); (d) power source or available power associated with the MTC device; and/or (e) a collision probability, which may reflect the density of MTC devices in a particular area that may be attempting to use a cluster head for connectivity.

Furthermore, eNodeB 106 may include a cluster head determining component 222, which may be configured to select one or more MTC devices to serve as cluster heads based on the polling responses 214 and one or more cluster head selection algorithms 224. In addition, once the cluster head information transmitting component 226 has selected one or more cluster heads for the MTC cluster, a cluster head information transmitting component 226 may transmit cluster head information 228 (e.g. via a direct message or broadcast message) to one or more MTC devices, for example, to advertise the availability of one or more cluster heads for MTC device use.

In some examples, cluster head information may be transmitted to the one or more MTC devices via a System Information Block portion of one or more control messages or broadcasts. For example, in a broadcast channel, the eNodeB may transmit one or more Master Information Blocks (MIBs) or System Information Blocks (SIBS) to communicate control information to one or more MTC devices. Currently, thirteen types of SIBS exist in Third Generation Partnership Project (3GPP) communication standards, and each SIB type is defined and classified to include unique information. However, there are no current methods for placing cluster head information in MIBs and/or SIBS in MTC device cluster environments.

Thus, the present disclosure presents methods and apparatuses for the eNodeB 106 to generate and transmit cluster head information in an SIB. Specifically, in some examples, this may include transmitting cluster head information in existing SIB types or may include transmitting cluster head information in a new SIB type designated for cluster head identification and informational purposes.

To connect to and utilize one or more cluster heads for uplink communication, an MTC device must be aware of certain pieces of cluster head information. In some examples, this information includes the Service Set Identifier (SSID) associated with the cluster head, and the WiFi Protected Access (WPA) and Pre-Determined Share Key (PSK) to allow the one or more MTC devices to communicate with the cluster head. Thus, eNodeB 102 may include an SSID ascertaining component 230, which may be configured to ascertain the SSID associated with one or more cluster heads. Furthermore, eNodeB 102 may include a WPA and PSK identifying component 232, which may be configured to identify a WPA and PSK associated with one or more cluster heads of the MTC device cluster.

In addition, based on current standards, there are at least two possibilities for transmitting cluster head information to the one or more MTC devices using SIBs. As stated above, there are thirteen types of SIBs in an LTE system. Each of these thirteen SIBs has its own means of classifying information. The most workable of the existing SIBs to utilize in transmitting cluster head information to one or more MTC devices is SIB2, which contains information to help a user equipment (UE) to access a cell in the current LTE standard. Likewise, in an aspect of the present disclosure, the WiFi SSIDs of the cluster heads and/or the related WPA and PSK information may be included in SIB2 and transmitted to the MTC devices to identify the cluster heads to the MTC devices for subsequent connection and uplink processes.

In a second option for transmitting cluster head information, a new SIB type may be added to the existing thirteen SIBs of the 3GPP LTE) standards. Currently, there exists no specific SIB that is defined with the intent to contain information needed to deal with the LTE and WiFi architecture of networks including MTC device clusters. In an aspect, this new SIB type may include, for example, (a) a "chSSIDList" field that includes the one or more identifiers of LTE and WiFi-based cluster heads of the MTC device cluster; (b) a "wpaType" field that indicates the type of wireless authentication protocol to use with each cluster head; and (c) a "wpaKeyInfo" field that indicates key information to access the cluster head WiFi network given its authentication protocol type.

Using the modified existing SIB type or new SIB type described above, the eNodeB 106 may transmit the SIB to one or more MTC devices using an SIB transmitting component 234. In some aspects, this SIB may be transmitted at a rate determined by the eNodeB 106, such as where the eNodeB 106 determines that a threshold number of MTC devices in the MTC cluster or network have compromised uplink capability. Alternatively or additionally, the SIB transmitting component 234 may transmit the one or more SIBs at a predetermined frequency (e.g. several times a second to once every 3000 seconds, or more frequently or less frequently, depending on the network conditions and devices comprising the network).

Figure 3:
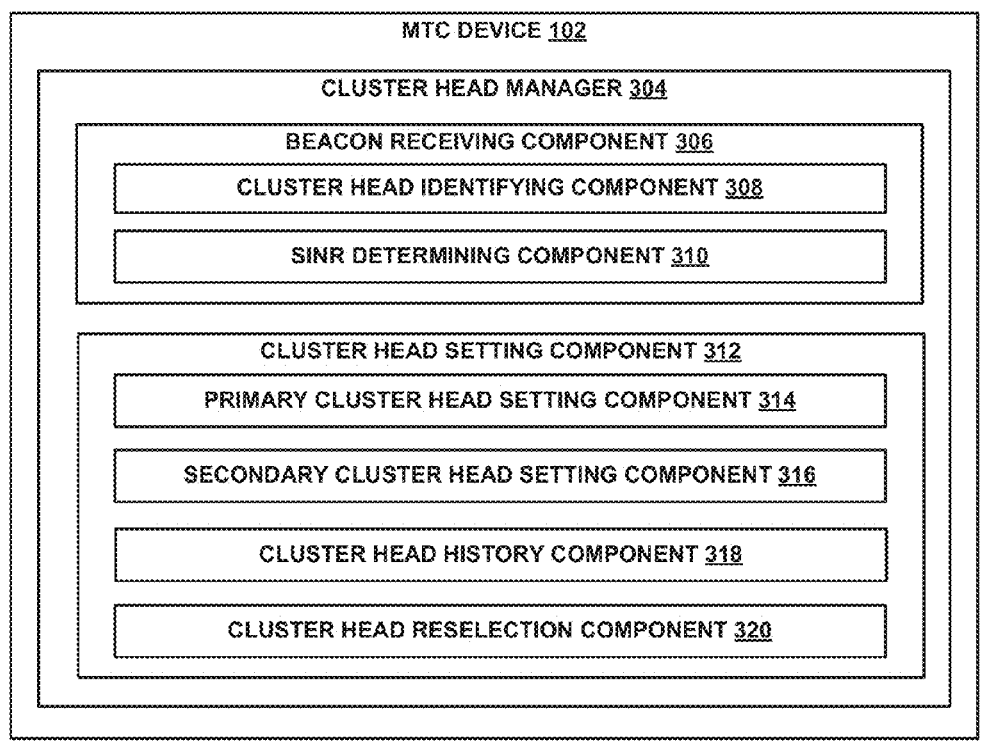
FIG. 3 is a block diagram illustrating an example MTC device according to an example embodiment of the present disclosure.

FIG. 3 is a block diagram illustrating components comprising an MTC device 102 of the present disclosure, which may be configured to communicate with one or more access points (e.g. eNodeBs), cluster heads, and/or other MTC devices, and may be configured to serve as a cluster head itself. In an aspect, MTC device 102 may include a cluster head manager 304, which may be configured to manage the communication of MTC device 102 with one or more other devices and the operation of MTC device 102 as a cluster head.

Cluster head manager 304 may include a beacon receiving component 306, which may be configured to receive one or more beacons associated with one or more cluster heads (and/or one or more eNodeBs). In some examples, the beacons may include a list of cluster heads that are in an available state (e.g. able to be used for cluster head uplink transmission assistance) and encryption and/or authentication information for connecting with each of the one or more cluster heads on the list of cluster heads. Based on the received beacons, a cluster head identifying component 308 of beacon receiving component 306 may identify the cluster head that transmitted the beacon (e.g. identify an SSID associated with the cluster head, etc.). Furthermore, an SINR determining component 310 of beacon receiving component may determine a signal strength, which may be represented as an SINR, associated with each of the one or more received beacons.

Furthermore, MTC device 102 may include a cluster head setting component 312, which may be configured to set one or more cluster heads as cluster heads associated with the MTC device 102 for uplink transmission purposes. In an aspect, cluster head setting component 312 may include a primary cluster head setting component 314, which may be configured to set a primary cluster head associated with MTC device 102 as the cluster head with the greatest SINR. In an additional aspect, cluster head setting component 314 may include a secondary cluster head setting component 316, which may be configured to set a secondary cluster head associated with the MTC device 102 as a cluster head with a second-greatest SINR. Furthermore, cluster head setting component 312 may include a cluster head history component 318, which may be configured to select a cluster head based on a stored history of cluster heads previously used by the MTC device for uplink communication transmissions. In some examples, this historical mechanism for cluster head selection may avoid unnecessary processing at the MTC device where a previously used cluster head is still available for use.

In addition, cluster head setting component 312 may include a cluster head reselection component 320, which may be configured to manage cluster head reselection for MTC device 102 based on one or more triggers. The MTC device 102 may select one or more new cluster heads when it loses cellular uplink connectivity or connectivity with a previous cluster head (primary or secondary or both). Additionally, the MTC may also periodically evaluate whether its existing primary or secondary cluster heads are appropriate (e.g. whether functioning properly, over-loaded, no connectivity, etc.) for continued service as a cluster head.

In an aspect, triggers for cluster head reselection by cluster head reselection component 320 may include event-driven and periodic triggers. For example, regarding example event-driven triggers, the MTC device 102 may be configured to reselect a new primary and/or secondary cluster head when coverage to the existing primary and/or secondary cluster head is lost. Furthermore, regarding periodic triggers, the MTC device 102 may periodically turn on its beacon receiving component 306 (e.g. LTE radio), to update the cluster head availability information from an eNodeB and then determine whether there exists a higher SINR than those associated with current primary and/or secondary cluster heads. Where there is a cluster head with a higher SINR of its WiFi channel, the MTC device 102 may choose the new cluster head as its primary and/or secondary cluster head.

Figure 4:
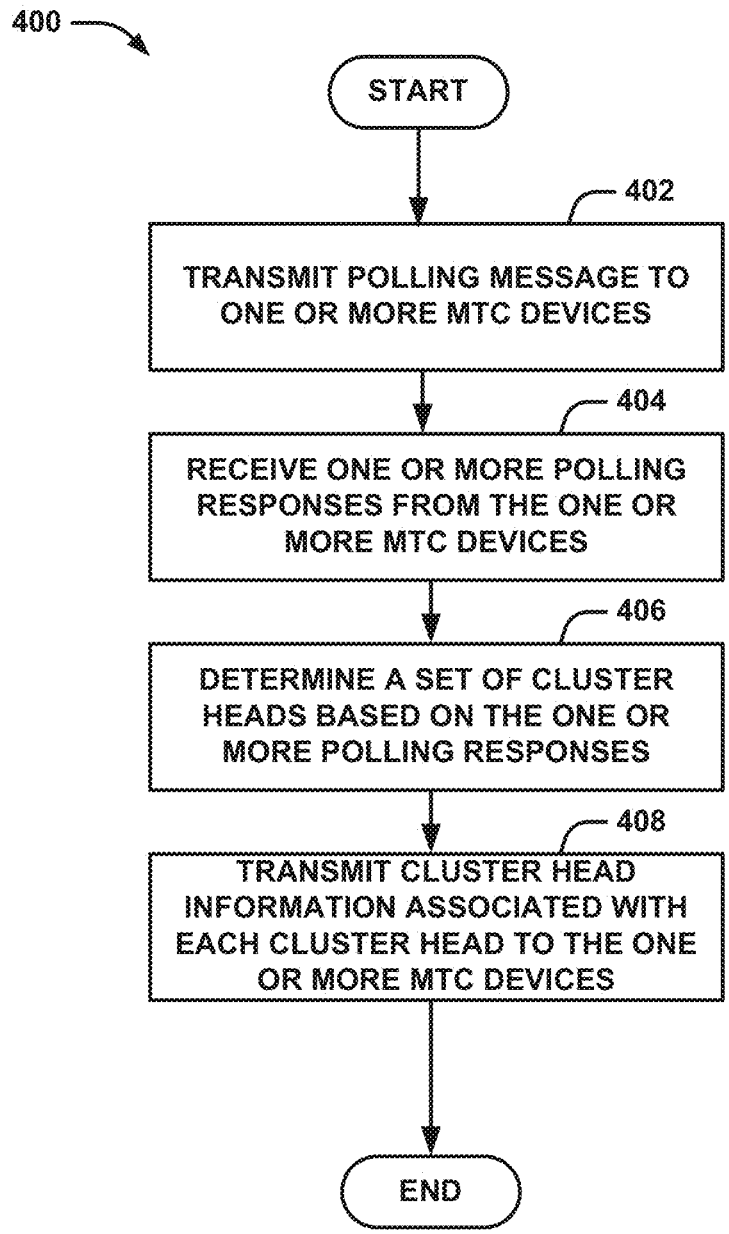
FIG. 4 is a flowchart illustrating a method for improved uplink power management in an eNodeB, according to an example embodiment.

FIG. 4 is a flowchart illustrating a method 400 for cluster head selection in network environments that include MTC devices and cluster heads, according to some example embodiments. In some examples, method 400 and/or any of the method steps comprising method 400 may be configured to be performed by a processing apparatus, which may include, in some examples, eNodeB 106 of FIGS. 1 and/or 2.

As shown in FIG. 4, method 400 may include, at block 402, transmitting a polling message from an eNodeB to one or more MTC devices of the MTC cluster, wherein the polling message includes a query as to which of the one or more MTC devices are willing to serve as a cluster head in a set of cluster heads. Furthermore, at block 404, the method may include receiving one or more polling responses at the eNodeB from the one or more MTC devices. In some examples, the one or more polling responses may include one or more of: an indication that the one or more MTC devices are willing to serve as the cluster head, a signal-to-noise ratio, a number of MTC devices previously supported, or a collision probability. In addition, at block 406, method 400 may include determining the set of cluster heads based on the one or more polling responses. Moreover, method 400 may include, at block 408, transmitting cluster head information associated with each cluster head of the set of cluster heads to the one or more MTC devices.

In some further examples, method 400 may also comprise receiving an end service message from a cluster head of the set of duster heads, wherein the end service message indicates that the cluster head is no longer serving as a cluster head. Additionally, method 400 may include transmitting an end service indication to the one or more MTC devices of the MTC cluster, wherein the end service indication indicates that the cluster head is no longer serving as a cluster head. In some examples, the end service message includes a time field indicating a time at which the cluster head will no longer serve as a cluster head, and the end service indication includes the time field.

Figure 5:
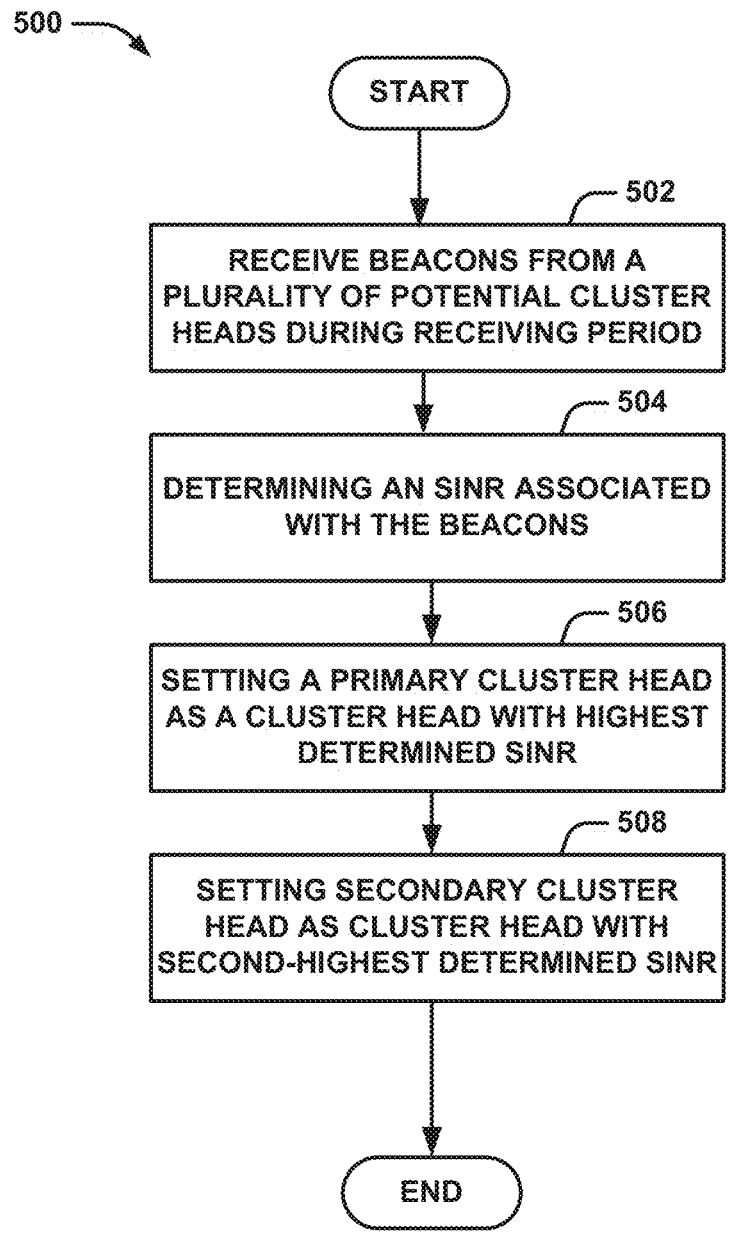
FIG. 5 is a flowchart illustrating a method for improved uplink power management in one or more MTC devices, according to an example embodiment.

FIG. 5 is a flowchart illustrating an additional method 500 for cluster head selection in network environments that include MTC devices and cluster heads, according to some example embodiments. In some examples, method 500 and/or any of the method steps comprising method 400 may be configured to be performed by a processing apparatus, which may include, in some examples, MTC device of FIGS. 1 and/or 3.

In an aspect, method 500 may include, at block 502, receiving, at an MTC device, beacons from a plurality of potential cluster heads during a receiving period. In addition, at block 504, method 500 may include determining, at the MTC device, a signal-to-noise ratio (SINR) associated with the beacons. Furthermore, method 500 may include, at block 506, setting a primary cluster head as a cluster head with a highest determined SINR. Additionally, at block 508, method 500 may include setting a secondary cluster head as a cluster head with a second-highest determined SINR.

In additional aspects of method 500, the receiving period may commence upon a loss of uplink capability associated with one or both of the primary cluster head and the secondary cluster head, and the receiving period may commence periodically at a predetermined frequency.

Figure 6:
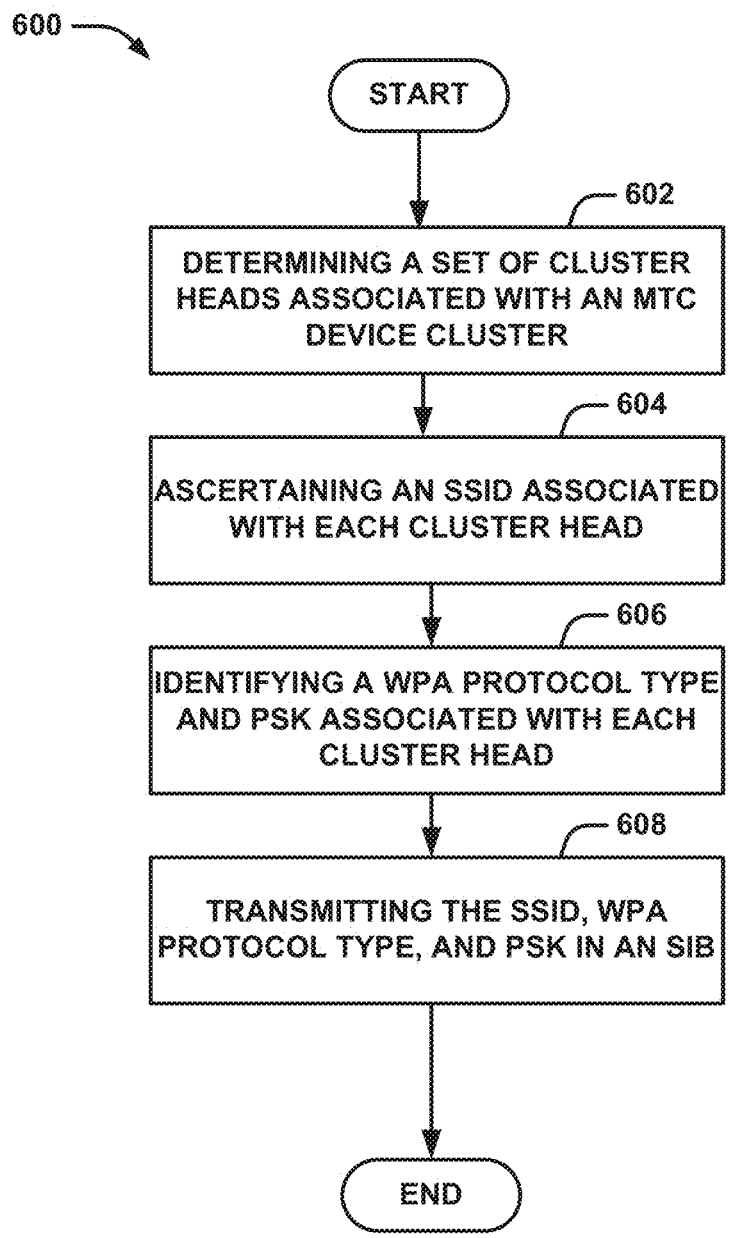
FIG. 6 flowchart illustrating a method for improved uplink power management in MTC networks, according to an example embodiment.

FIG. 6 is a flowchart illustrating an additional method 600 for broadcasting MTC device cluster head information in network environments that include MTC devices and cluster heads, according to some example embodiments. In some examples, method 600 and/or any of the method steps comprising method 400 may be configured to be performed by a processing apparatus, which may include, in some examples, eNodeB 106 of FIGS. 1 and/or 2.

In some examples, method 600 may include, at block 602, determining a set of cluster heads associated with an MTC device cluster, wherein the set of cluster heads comprises one or more MTC devices. Furthermore, at block 604, method 600 may include ascertaining a service set identifier associated with each cluster head of the set of cluster heads. Moreover, at block 606, method 600 may include identifying a WPA protocol type and a PSK associated with each cluster head of the set of cluster heads. Additionally, at block 608, method 600 may include transmitting the SSID, WPA protocol type, and PSK associated with each cluster head of the set of cluster heads in a System Information Block message. In example further aspects of method 600, the SIB message may comprise an SIB Type 2 message of the Long Term Evolution (LTE) communication protocol.

Figure 7:
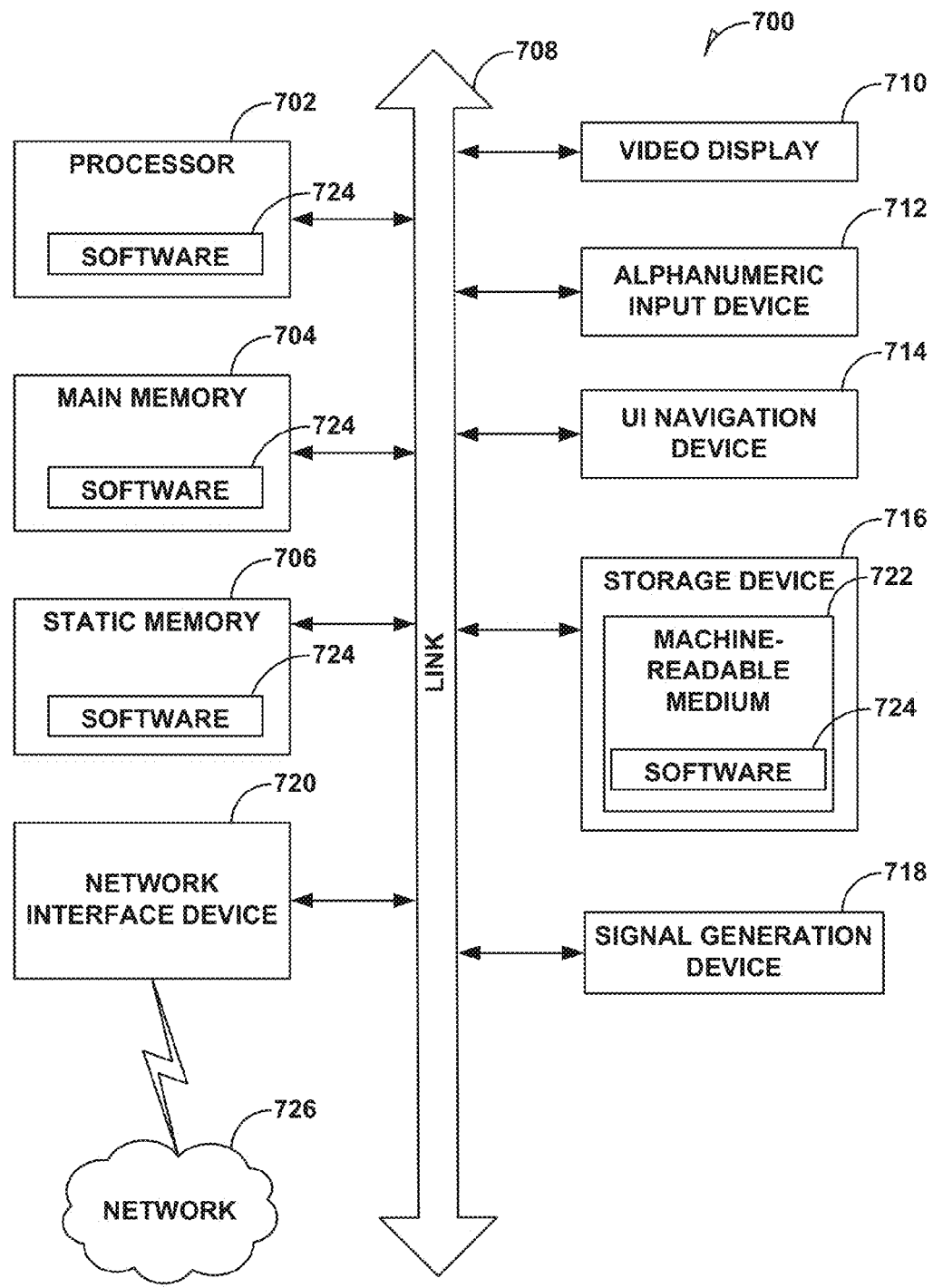
FIG. 7 is a block diagram illustrating a machine in the example form of a computer system, within which a set or sequence of instructions for causing the machine to perform any one of the methodologies discussed herein may be executed, according to an example embodiment.

FIG. 7 is a block diagram illustrating a machine in the example form of a computer system 700, within which a set or sequence of instructions for causing the machine to perform any one of the methodologies discussed herein may be executed, according to an example embodiment. In alternative embodiments, the machine operates as a stand-alone device or may be connected (e.g. networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes at least one processor 702 (e.g. a central processing unit (CPU), a graphics processing unit (GPU) or both, processor cores, compute nodes, etc.), a main memory 701 and a static memory 705, which communicate with each other via a link 708 (e.g. bus). The computer system 700 may further include a video display unit 710, an alphanumeric input device 712 (e.g. a keyboard), and a user interface (UI) navigation device 711 (e.g. a mouse). In one embodiment, the video display unit 710, input device 712 and UI navigation device 714 are incorporated into a touch screen display. The computer system 700 may additionally include a storage device 715 (e.g. a drive unit), a signal generation device 718 (e.g. a speaker), a network interface device 720, and one or more sensors (not shown), such as a global positioning system (GPS) sensor, compass, accelerometer, or other sensor.

The storage device 715 includes a machine-readable medium 722 on which is stored one or more sets of data structures and instructions 724 (e.g. software) embodying or utilized by any one or more of the methodologies or functions described herein. The instructions 724 may also reside, completely or at least partially, within the main memory 704, static memory 705, and/or within the processor 702 during execution thereof by the computer system 700, with the main memory 704, static memory 705, and the processor 702 also constituting machine-readable media.

While the machine-readable medium 722 is illustrated in an example embodiment to be a single medium, the term "machine-readable medium" may include a single medium or multiple media (e.g. a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g. Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g. HTTP). Examples of communication networks include a local area network (LAN), a wide area network (WAN), the Internet, mobile telephone networks, Plain Old Telephone (POTS) networks, and wireless data networks (e.g. Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples, as described herein, may include, or may operate on, logic or a number of components, components, or mechanisms. Components are tangible entities capable of performing specified operations and may be configured or arranged in a certain manner. In an example, circuits may be arranged (e.g. internally or with respect to external entities such as other circuits) in a specified manner as a component. In an example, the Whole or part of one or more computer systems (e.g. a standalone, client or server computer system) or one or more hardware processors may be configured by firmware or software (e.g. instructions, an application portion, or an application) as a component that operates to perform specified operations. In an example, the software may reside (1) on a non-transitory machine-readable medium or (2) in a transmission signal. In an example, the software, when executed by the underlying hardware of the component, causes the hardware to perform the specified operations.

Accordingly, the terms "component" and "component" are understood to encompass a tangible entity, be that an entity that is physically constructed, specifically configured (e.g. hardwired), or temporarily (e.g. transitorily) configured (e.g. programmed) to operate in a specified manner or to perform part or all of any operation described herein. Considering examples in which components are temporarily configured, one instantiation of a component may not exist simultaneously with another instantiation of the same or different component. For example, where the components comprise a general-purpose hardware processor configured using software, the general-purpose hardware processor may be configured as respective different components at different times. Accordingly, software may configure a hardware processor, for example, to constitute a particular component at one instance of time and to constitute a different component at a different instance of time.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure. The preceding description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

Additional Notes & Examples

Example 1 may include subject matter (such as a method, means for performing acts, machine readable medium including instructions that, when performed by a machine cause the machine to performs acts, or an apparatus configured to perform), comprising transmitting a polling message from an eNodeB to one or more MTC devices of the MTC cluster, wherein the polling message includes a query as to which of the one or more MTC devices are willing to serve as a cluster head in a set of cluster heads; receiving one or more polling responses at the eNodeB from the one or more MTC devices, where the one or more polling responses include one or more of: an indication that the one or more MTC devices are willing to serve as the cluster head, a signal-to-noise ratio, a number of MTC devices previously supported, or a collision probability; determining the set of cluster heads based on the one or more polling responses; and transmitting cluster head information associated with each cluster head of the set of cluster heads to the one or more MTC devices.

Example 2 may include, or may optionally be combined with the subject matter of Example 1 to optionally include an aspect wherein the polling message further includes incentive information offering an incentive for an MTC device to serve as the cluster head.

Example 3 may include, or may optionally be combined with the subject matter of Examples 1 and/or 2 to optionally include an aspect wherein transmitting the polling message further comprises transmitting the polling message upon the occurrence of a polling message triggering event.

Example 4 may include, or may optionally be combined with the subject matter of any of Examples 1-3, to optionally include an aspect wherein the polling message triggering event comprises one or more of a traffic load associated with an existing cluster head reaches a traffic load threshold; a number of served MTC devices associated with an existing cluster head reaches a served MTC device threshold; or a polling interval expires.

Example 5 may include, or may optionally be combined with the subject matter of any of Examples 1-4, to optionally include receiving an end service message from a cluster head of the set of cluster heads, wherein the end service message indicates that the cluster head is no longer serving as a cluster head; and transmitting an end service indication to the one or more MTC devices of the MTC cluster, wherein the end service indication indicates that the cluster head is no longer serving as a cluster head.

Example 6 may include, or may optionally be combined with the subject matter of any of Examples 1-5, to optionally include an aspect wherein the end service message includes a time field indicating a time at which the cluster head will no longer serve as a cluster head.

Example 7 may include, or may optionally be combined with the subject matter of any of Examples 1-6, to optionally include an aspect wherein the end service indication includes the time field.

Example 8 may include subject matter (such as a method, means for performing acts, machine readable medium including instructions that, when performed by a machine cause the machine to performs acts, or an apparatus configured to perform), which may optionally be in addition to any one or combination of Examples 1-7, comprising receiving, at an MTC device, beacons from a plurality of potential cluster heads during a receiving period; determining, at the MTC device a signal-to-noise ratio (SINR) associated with the beacons; setting a primary cluster head as a cluster head with a highest determined SINR; and setting a secondary cluster head as a cluster head with a second-highest determined SINR.

Example 9 may include, or may optionally be combined with the subject matter of any of Examples 1-8, to optionally include an aspect wherein the receiving period commences upon a loss of uplink capability associated with one or both of the primary cluster head and the secondary cluster head.

Example 10 may include, or may optionally be combined with the subject matter of any of Examples 1-9, to optionally include an aspect wherein the receiving period commences periodically at a predetermined frequency.

Example 11 may include subject matter (such as a method, means for performing acts, machine readable medium including instructions that, when performed by a machine cause the machine to performs acts, or an apparatus configured to perform), which may optionally be in addition to any one or combination of Examples 1-10, comprising determining a set of cluster heads associated with an MTC device cluster, wherein the set of cluster heads comprises one or more MTC devices; ascertaining a service set identifier (SSID) associated with each cluster head of the set of cluster heads; identifying a WiFi Protected Access (WPA) protocol type and a pre-determined share key (PSK) associated with each cluster head of the set of cluster heads; and transmitting the SSID, WPA protocol type, and PSK associated with each cluster head of the set of cluster heads in a System Information Block (SIB) message.

Example 12 may include, or may optionally be combined with the subject matter of any of Examples 1-9, to optionally include an aspect wherein the SIB message is an SIB Type 2 message of the Long Term Evolution (LTE) communication protocol.

Example 13 may include subject matter (such as an apparatus, mobile apparatus, MTC device, user equipment, network device, eNodeB, communication apparatus or device, hardware, component, or component), which may optionally be in addition to any one or combination of Examples 1-12, comprising a polling message transmitting component configured to transmit a polling message from the eNodeB to one or more MTC devices of the MTC cluster, wherein the polling message includes a query as to which of the one or more MTC devices are willing to serve as a cluster head in a set of cluster heads; a polling response receiving component configured to receive one or more polling responses at the eNodeB from the one or more MTC devices, where the one or more polling responses include one or more of; an indication that the one or more MTC devices are willing to serve as the cluster head, a signal-to-noise ratio, a number of MTC devices previously supported, or a collision probability; a cluster head determining component configured to determine the set of cluster heads based on the one or more polling responses; and a cluster head information transmitting component configured to transmit cluster head information associated with each cluster head of the set of cluster heads to the one or more MTC devices.

Example 14 may include subject matter (such as an apparatus, mobile apparatus, MTC device, user equipment, network device, eNodeB, communication apparatus or device, hardware, component, or component), which may optionally be in addition to any one or combination of Examples 1-13, comprising a beacon receiving component configured to receive, at the MTC device, beacons from a plurality of potential cluster heads during a receiving period; a signal-to-noise ratio (SINR) determining component configured to determine, at the MTC device, a signal-to-noise ratio (SINR) associated with the beacons; a primary cluster head setting component configured to set a primary cluster head as a cluster head with a highest determined SINR; and a secondary cluster head setting component configured to set a secondary cluster head as a cluster head with a second-highest determined SINR.

Example 15 may include subject matter (such as an apparatus, mobile apparatus, MTC device, user equipment, network device, eNodeB, communication apparatus or device, hardware, component, or component), which may optionally be in addition to any one or combination of Examples 1-14, comprising a cluster head determining component configured to determine a set of cluster heads associated with an MTC device cluster, wherein the set of cluster heads comprises one or more MTC devices; a service set identifier (SSID) ascertaining component configured to ascertain an SSID associated with each cluster head of the set of cluster heads; a WiFi Protected Access (WPA) protocol type and a pre-determined share key (PSK) identifying component, configured to identify a WPA protocol type and a PSK associated with each cluster head of the set of cluster heads; and a System Information Block (SIB) transmitting component configured to transmit the SSID, WPA protocol type, and PSK associated with each cluster head of the set of cluster heads in an SIB message.

What is claimed is:

1. A method performed by an enhanced node B (eNodeB) comprising:
   transmitting a polling message from the eNodeB to a plurality of machine-type communications (MTC) devices;
   receiving one or more polling responses from the MTC devices, the polling responses including an indication as to whether an associated beacon-transmitting MTC device is willing to serve as a cluster head for a cluster of MTC devices, and one or more of a signal-to-noise ratio of one or more beacons received by an associated beacon-receiving MTC device from one or more other MTC devices from among the beacon-transmitting devices willing to serve as cluster heads, a number of MTC devices previously supported, and a collision probability;
   selecting one or more of the beacon-transmitting MTC devices to serve as the cluster head based on the polling responses; and
   transmitting cluster head information to the MTC devices to indicate which of the MTC devices are selected to serve as the cluster head.

2. The method of claim 1, wherein the polling message including a query requesting which of the MTC devices are willing to serve as a cluster head for a cluster of MTC devices.

3. The method of claim 2 wherein the polling message further includes incentive information offering an incentive for an MTC device to serve as the cluster head.

4. The method of claim 2 wherein the one or more beacons are received by an associated MTC device from one or more other MTC devices willing to serve as a potential cluster head.

5. The method of claim 4 the polling message is transmitted upon the occurrence of a polling message triggering event, and
wherein the polling message triggering event comprises one or more of: a traffic load associated with an existing cluster head reaching a traffic load threshold; a number of served MTC devices associated with an existing cluster head reaching a served MTC device threshold; and a polling interval expiration.

6. The method of claim 5, further comprising:
receiving an end service message from one of the cluster heads, the end service message indicating that the cluster head is no longer serving as a cluster head; and
transmitting an end service indication to the one or more MTC devices of the MTC cluster, wherein the end service indication indicates that the cluster head is no longer serving as a cluster head.

7. The method of claim 6, wherein the end service message includes a time field indicating a time at which the cluster head will no longer serve as a cluster head, and
wherein the end service indication includes the time field.

8. An enhanced Node B (eNodeB) arranged for servicing a machine-type communications (MTC) device cluster, the eNodeB arranged to:
transmit a polling message to a plurality of machine-type communications (MTC) devices;
receive one or more polling responses from the MTC devices, the polling responses including an indication as to whether an associated beacon-transmitting MTC device is willing to serve as a cluster head for a cluster of MTC devices, and one or more of a signal-to-noise ratio of one or more beacons received by an associated beacon-receiving MTC device from one or more other MTC devices from among the beacon-transmitting devices willing to serve as cluster heads, a number of MTC devices previously supported, and a collision probability;
select one or more of the beacon-transmitting MTC devices to serve as the cluster head based on the polling responses; and
transmit cluster head information associated with each selected cluster head to the MTC devices to indicate which of the MTC devices are selected to serve as the cluster head.

9. The eNodeB of claim 8 wherein the polling message includes a query requesting which of the MTC devices are willing to serve as a cluster head for a cluster of MTC devices,
wherein the polling message is transmitted upon the occurrence of a polling message triggering event, and
wherein the polling message triggering event comprises one or more of: a traffic load associated with an existing cluster head reaching a traffic load threshold; a number of served MTC devices associated with an existing cluster head reaching a served MTC device threshold; and a polling interval expiration.

10. The eNodeB of claim 9 wherein the polling message further includes incentive information offering an incentive for an MTC device to serve as the cluster head.

11. The eNodeB of claim 9 wherein the beacon is received from an MTC device which is a potential cluster head, and
wherein the eNodeB is arranged to receive relayed uplink communications from the selected cluster heads originating from MTC devices not selected to serve as a cluster head.

* * * * *